March 1, 1966      P. B. PRITCHARD      3,237,739

CLUTCH WITH SLOTTED SPRING DISC

Filed Dec. 21, 1962

INVENTOR.
Paul B. Pritchard
BY
A. M. Neiter
ATTORNEY

United States Patent Office 3,237,739
Patented Mar. 1, 1966

3,237,739
CLUTCH WITH SLOTTED SPRING DISC
Paul B. Pritchard, Danville, Ind., assignor to General Motors Corporation, Detroit, Mich., a corporation of Delaware
Filed Dec. 21, 1962, Ser. No. 246,402
5 Claims. (Cl. 192—89)

This invention relates to a control system employing a combined slotted conical plate spring and lever and particularly to a slotted conical plate spring lever.

In control systems, particularly those used in automatic transmissions, where a fluid actuted motor is connected by a slotted conical plate lever spring to actuate a friction device for establishing a drive, fatigue failure of the springs has been a problem particularly in heavy duty applications. This is believed to be due to stress concentrations produced by the simultaneous functioning of the slotted conical plate lever spring as a lever or beam and as a slotted conical plate spring. During operation for applying a friction device, the slotted conical plate lever spring is first moved under a low pressure to take up slack by reducing the cone angle of the slotted conical plate spring. Thereafter, while providing a high applying pressure to the friction device, the cone angle is further reduced and a high force transmitted by the lever acting as a lever or beam which deflects or bends the lever causing additional beam stresses in the stressed slotted conical plate spring. It is proposed in a slotted conical plate lever spring to provide slots alternately extending from the outer diameter toward the inner diameter and from the inner diameter about two-thirds of the distance toward the outer diameter in the region of the central pivot. The end of the slot extending inwardly from the outer diameter has an enlarged rounded portion close to the inner diameter and the spring material around this rounded portion and between the adjacent slots extending from the inner diameter is rounded to provide an area extending past or bridging the slot extending from the outer diameter of substantially uniform cross-section to distribute the slotted conical plate spring bending force over a large area. Also, the pivot line at the inner edge of the lever is spaced near this edge so that no significant bending forces are created in this area due to lever deflection. The outer perimeter of the lever between the slots extending inwardly from the outer perimeter are full circular portions to provide full bearing areas contacting the outer pivot. This provides a more rigid spring area bridging the slots extending outwardly from the inner diameter so that the slotted conical plate spring bending action does not occur in this area but only occurs in the above-mentioned areas of the end of the slots extending inwardly from the outer diameter. The central pivot diameter is substantially at the ends of the outwardly extending slots so there is full bearing at both the central and outer pivot circles to maintain the spring in a truer conical shape to minimize stress concentrations. This rigid area provides a rigid beam section between the outer pivot and the central pivot to help maintain a true conical shape. The areas between the slots provide a strong but slightly flexible lever portion in which there is some bending during high force application.

An object of the invention is to provide in a fluid actuated friction engaging device having a fluid motor connected by a slotted conical plate lever spring to actuate a friction device, a slotted conical plate lever spring having slots extending inwardly from the outer diameter and outwardly from the inner diameter with the terminal end of the inwardly extending slots having enlarged rounded portion and the inner perimeter rounded between the outwardly extending slots and the outer diameter between the slots being formed as portions of the outer circular diameter for substantially full bearing engagement with the outer pivot.

Another object of the invention is to provide in a transmission control system having a fluid motor connected by a slotted conical plate lever spring to actuate a friction engaging device wherein the slotted conical plate lever spring has a pivot at the outer diameter, a central pivot and a pivot spaced outwardly from the inner diameter and the slotted conical plate spring has an annular conical shape with alternate slots extending inwardly from the outer diameter and outwardly from the inner diameter with the inwardly extending slots terminating in a large rounded portion and the outer diameter being formed by portions to form a substantially continuous circle and the inner diameter being rounded between each pair of outwardly extending slots to form a semi-circular area of substantially continuous cross-section bridging the inwardly extending slots.

Another object of the invention is to provide in a transmission control system having a fluid motor connected by a slotted conical plate lever spring to actuate a friction engaging device wherein the slotted conical plate lever spring has a pivot at the outer diameter, a central pivot and a pivot spaced outwardly from the inner diameter and the slotted conical plate spring has a generally annular conical shape with alternate slots extending inwardly from the outer diameter terminating in a rounded aperture adjacent the inner pivot and an intermediate slot extending outwardly from the inner diameter and terminating at the central pivot and the outer diameter being formed by portions forming a substantially continuous circle at the outer pivot and the inner diameter being rounded between each pair of outwardly extending slots to form a semi-circular area of substantially continuous cross-section bridging the inwardly extending slots.

These and other objects of the invention will be more apparent from the following description and drawing of the preferred embodiment of the invention.

FIGURE 1 shows a fluid actuator for a friction device employing a slotted conical plate lever spring.

FIGURE 2 is an enlarged view of the slotted conical plate lever spring.

FIGURE 3 is a section of FIGURE 2 on the line 3—3.

The invention is illustrated in a conventional transmission arrangement employing an input shaft 10 which drives the sun gear 11 and a planetary gear set 12 having planetary pinions 14 meshing with the sun gear 11 and a ring gear 16 which is retarded by the fluid actuated brake or friction engaging device 17 to provide a drive through the carrier 18 on which the pinions 14 are mounted to the output shaft 19. The friction engaging assembly includes a brake 21, a slotted conical plate lever spring 22 and a fluid motor 23. The brake has a plurality of intermediate plates 26 located between the fixed abutment 27 which is supported on the housing and intermediate plate 28 and an actuator plate 29 having a central ring-like or circular pivot 31 both splined to the fixed abutment 27. The motor 23, fixed on the housing, has a cylinder portion 33 in which the piston 34 is reciprocally mounted. The piston also has a circular or ring-like pivot 36. Force of the piston is transferred to the apply plate 29 by a slotted conical plate lever spring 22 which is engaged by the piston adjacent its inner diameter by the pivot 36, engages the apply plate at a central pivot 31 and is pivoted on the housing portion 25 at the outer diameter or outer pivot mounted in the pivot recess 37.

In FIGURE 1, the motor and slotted conical plate lever spring is shown in the disengaged position (A) in full line. The motor will initially move under a low force to take up slack in the mechanism to the position (B) shown in the first dotted line position causing the cone angle of the slotted conical plate spring to be reduced. The force is not large enough to cause any significant bending of the slotted conical plate lever spring as a beam or lever. Thereafter to finally apply the friction device a much higher pressure is exerted by the motor 23 and the slotted conical plate lever spring is further deformed to reduce the cone angle and to deflect the lever as shown by position (C).

The slotted conical plate lever spring shown in detail in FIGURES 2 and 3 has a general annular conical shape with a plurality of alternating inwardly extending slots 41 and outwardly extending slots 42. The inwardly extending slots extend inwardly from the outer perimeter and terminate in an enlarged round terminal portion 43 which in conjunction with the rounded inner edge 44, preferably as a circle about the center of the enlarged terminal end 43 of slot 41, provide a semi-circular bridging portion extending between pairs of outward slots 42 and across or bridging the slot 41. This bridging portion has a substantially uniform width and section with a gradual enlargement fairing into the lever portion 46 extending radially between the slots 41 and 42.

It will be noted that the slot 41 extends inwardly substantially to the inner diameter of the slotted conical plate lever spring so that the semi-circular bridging portion has substantially the same width and thus cross-section throughout its length around the enlarged rounded terminal portion 43 to equally distribute Belleville stress. The outwardly extending slots 42 terminate about two-thirds of the distance toward the outer diameter substantially at the circular pivot 30 indicated by the dot-dash line, FIGURE 2, where the slotted conical plate lever spring engages the circular pivot 31. The outer diameter portion between the slots 41 are portions of the full outer circular perimeter of the slotted conical plate lever spring to provide maximum length about the perimeter of the annular slotted conical plate lever spring for engagement at the circular pivot 35 with the outer pivot 37. The inner circular pivot 45, during the phases of movement between position (B) and position (C) where lever bending stresses occur, will be spaced outwardly from the inner diameter.

Thus during operation, the bridging portion at the outer diameter bridging the outwardly extending slots 42 and located between the slots 41, which is a heavy rigid section, has substantially minimal deflection due to change in cone angle of the slotted conical plate spring. The lighter weight semi-circular bridging portion bridging slot 41 and located between the outwardly extending slots 42 deflects to accommodate the change of cone angle of the slotted conical plate lever spring during operation. During movement from the position (B) to the position (C) the high pressure deflects the lever a little in the outer rigid section and considerably more in the light portions 46 between the slots 41 and 42. The stress due to bending of the slotted conical plate lever spring as a lever or beam is maximum at the central pivot 30 and gradually reduces to zero at the outer pivot 35 and inner pivot 45. The inner semi-circular portion in which the deflection due to change of cone angle occurs is not significantly stressed as a beam since this portion is at or inside the inner diameter pivot.

In forming a slotted conical plate lever spring, it is important that the residual stresses incorporated into the lever spring during manufacture be relieved. First an annular blank is formed. Then the slotting operation is performed by moving the main punching die in the direction indicated by the arrow P and the round hole punching die in the opposite direction PH and by coining the slots in critical areas. Thus the punch side or the initially cut side of the spring at the edges of the slots is the outside or convex side of the spring and the punch side or the initially cut side of the spring at the edges of the holes is the inside or concave side of the spring. The slot 41 is coined on both sides and at the rounded end portion 43 over the area generally indicated by 51. The slot 42 is also coined over the inner portion 52 to relieve the stresses at the edges. The edge 53 of the hole 43 is also coined on the underside of the slotted conical plate clutch spring. Then an annular ring is die cut from the inner edge to form the inner scalloped perimeter. Then the blank is formed to a cone having a smaller apex angle and placed in a heat treat die to reduce the cone angle to the design value and then heat treated and quenched. Since the outer surface of the slotted conical plate spring is stressed higher than the inner surface, it is important that the metal at this surface be smoothly formed. This is accomplished by slotting the blank by a blank first engaging this surface to obtain a sharper cut at the higher stressed side. The holes or rounded ends 43 of the slots 41 are punched from the opposite direction to provide the sharper cut edge on the inside surface of the conical member. This has been found to provide remarkably improved spring life.

It will be appreciated that the above described preferred embodiment of the invention may be modified within the scope of the appended claims.

I claim:

1. In a transmission; drive means having friction engaging means for establishing a drive; a support having a large diameter circular pivot; said friction engaging means having an apply member having an intermediate diameter circular pivot; an actuator having a small diameter circular pivot for applying a force; a slotted conical plate lever spring of annular shape having its outer diameter pivoted to said large diameter circular pivot, a central portion engaging said intermediate diameter circular pivot and a portion spaced outwardly from the inner diameter engaging said small diameter circular pivot; said annular slotted conical plate lever spring having a plurality of outwardly extending slots extending from the inner diameter of the slotted conical plate spring to the intermediate pivot diameter; a plurality of intermediate inwardly extending slots extending from the outer diameter substantially to the small pivot diameter; said inwardly extending slots terminating in a rounded enlarged portion; the outer perimeter being substantially circular except for said inwardly extending slots; and the inner perimeter at the inner diameter of said slotted conical plate lever spring being rounded between each pair of outwardly extending slots on a curve substantially concentric with the rounded portion at the terminal end of the inwardly extending slot to form a semicircular region of substantially uniform cross-section area in all radial sections of the bridging around the rounded enlarged portion and across each of said inwardly extending slots.

2. In a transmission; drive means having friction engaging means for establishing a drive; a support having a large diameter circular pivot; said friction engaging means having an apply member having an intermediate diameter circular pivot; an actuator having a small diameter circular pivot for applying a force; a slotted conical plate lever spring of annular shape having a concave side and a convex side and having its outer diameter pivoted to said large diameter circular pivot; a central portion engaging said intermediate diameter circular pivot and a portion spaced outwardly from the inner diameter engaging said small diameter circular pivot; said annular slotted conical plate lever spring having a plurality of outwardly extending narrow slots extending from the inner diameter of the slotted conical plate spring to the intermediate pivot diameter; a plurality of intermediate inwardly extending narrow slots extending from the outer diameter substantially to the small pivot diameter with an inwardly extending slot located between each pair of outwardly extending slots; each of said inwardly extending slots terminating in a rounded enlarged portion; the outer circumference of said slotted conical plate lever spring being formed by large circular portions forming a complete circle except for said inwardly extending narrow slots for contact with said large diameter circular pivot to in conjunction with said intermediate pivot hold said slotted conical plate lever spring in a conical shape; and the inner diameter of said slotted conical plate lever spring being rounded between each pair of outwardly extending slots on a curve substantially concentric with the rounded portion at the terminal end of the inwardly extending slot to form a semi-circular region of substantially uniform cross-section area in all radial sections of the bridging portion around the rounded enlarged portion and across each of said inwardly extending slots.

3. In a slotted conical plate lever spring, an annular member having the form of a conical section having a concave side and a convex side; an outer circular pivot substantially at the outer perimeter; an intermediate circular pivot located centrally of said member nearer the outer perimeter; an inner circular pivot adjacent to and spaced outwardly from the inner perimeter of said annular member; a plurality of outwardly extending slots extending from the inner perimeter substantially to said intermediate circular pivot; an inwardly extending narrow slot extending almost to said inner circular pivot located between each pair of outwardly extending slots; said inwardly extending slots each terminating in a rounded enlarged portion; the inner perimeter being scalloped by rounding each portion between pairs of outwardly extending slots similar to said rounded enlarged portion to form a semi-circular inner bridging region of substantially uniform cross-section area bridging across each of said inwardly extending slots; and said outer perimeter being circular and interrupted only by said inwardly extending narrow slots to provide heavier rigid outer bridging region bridging said outwardly extending slots.

4. The invention defined in claim 2 and said slots having sheared edges having a punch side on the convex side of said conical plate lever spring and said rounded enlarged portions having sheared edges with a punch side on the concave side of said conical plate lever spring.

5. The invention defined in claim 3 and said slots having sheared edges having a punch side on the convex side of said conical plate lever spring and said rounded enlarged portions having sheared edges with a punch side on the concave side of said conical plate lever spring.

References Cited by the Examiner
UNITED STATES PATENTS

| | | | |
|---|---|---|---|
| 404,284 | 5/1889 | Johnson. | |
| 1,941,892 | 1/1934 | Greve | 153—2 |
| 2,358,350 | 9/1944 | Schoenrock | 153—2 |
| 2,630,897 | 3/1953 | Porter | 192—89 |
| 2,725,964 | 12/1955 | Maurer | 192—68 |
| 2,806,568 | 9/1957 | Bliss | 192—89 |
| 2,952,453 | 9/1960 | Haussermann | 192—89 |
| 3,013,792 | 12/1961 | Sleinlein | 267—1 |

FOREIGN PATENTS

| | | |
|---|---|---|
| 748,379 | 5/1956 | Great Britain. |

DAVID J. WILLIAMOWSKY, *Primary Examiner.*